United States Patent
Pazi et al.

(10) Patent No.: US 7,171,683 B2
(45) Date of Patent: Jan. 30, 2007

(54) PROTECTING AGAINST DISTRIBUTED DENIAL OF SERVICE ATTACKS

(75) Inventors: Guy Pazi, Ramat Hasharon (IL); Anat Bremler-Bar, Holon (IL); Rami Rivlin, Tel Aviv (IL); Dan Touitou, Ramat Gan (IL)

(73) Assignee: Riverhead Networks Inc., Menlo Park, CA (US)

( * ) Notice: Subject to any disclaimer, the term of this patent is extended or adjusted under 35 U.S.C. 154(b) by 818 days.

(21) Appl. No.: 10/232,993

(22) Filed: Aug. 29, 2002

(65) Prior Publication Data

US 2003/0110274 A1    Jun. 12, 2003

Related U.S. Application Data

(60) Provisional application No. 60/316,198, filed on Aug. 30, 2001.

(51) Int. Cl.
 G06F 9/00   (2006.01)
 G06F 15/16  (2006.01)
 G06F 17/00  (2006.01)
 G06F 15/173 (2006.01)
 H04L 9/00   (2006.01)

(52) U.S. Cl. .......................... 726/13; 709/224; 713/161

(58) Field of Classification Search .................. 726/13; 709/224; 713/161
See application file for complete search history.

(56) References Cited

U.S. PATENT DOCUMENTS

| 6,055,236 | A | 4/2000 | Nessett et al. |
| 6,185,680 | B1 | 2/2001 | Shimbo et al. |
| 6,192,404 | B1* | 2/2001 | Hurst et al. ................ 709/224 |
| 6,502,135 | B1 | 12/2002 | Munger et al. |
| 6,795,917 | B1* | 9/2004 | Ylonen ........................ 713/160 |
| 6,856,627 | B1* | 2/2005 | Saleh et al. ................. 370/397 |
| 6,922,417 | B1* | 7/2005 | Vanlint ....................... 370/503 |
| 7,028,179 | B1* | 4/2006 | Anderson et al. ........... 713/154 |
| 2003/0033430 | A1* | 2/2003 | Lau et al. .................... 709/245 |
| 2003/0172289 | A1* | 9/2003 | Soppera ....................... 713/200 |
| 2004/0003116 | A1* | 1/2004 | Munger et al. ............. 709/245 |
| 2005/0089016 | A1* | 4/2005 | Zhang et al. ................ 370/351 |

OTHER PUBLICATIONS

"Practical Approaches to Dealing with DdoS Attacks" Presented at North America Network Operators' Group (NANOG22, Scottsdale, Arizona), May 2001.
U.S. Appl. No. 09/929,877, filed Aug. 14, 2001, entitled "Method and apparatus for protecting against overload conditions on nodes of a distributed network".
U.S. Appl. No. 60/316,198, filed Aug. 30, 2001, entitled "Method and apparatus for protecting against spoofed packet-based distributed denial of service attacks".

* cited by examiner

*Primary Examiner*—Ayaz Sheikh
*Assistant Examiner*—Arezoo Sherkat
(74) *Attorney, Agent, or Firm*—Darby & Darby

(57) ABSTRACT

A method for authenticating packet communication traffic includes receiving a data packet sent over a network from a source address to a destination address and reading from the packet a value of a field that is indicative of a number of hops traversed by the packet since having been sent from the source address. The authenticity of the source address is assessed responsive to the value.

54 Claims, 3 Drawing Sheets

PROTECTING AGAINST DISTRIBUTED DENIAL OF SERVICE ATTACKS

CROSS-REFERENCE TO RELATED APPLICATIONS

This application claims the benefit of U.S. Provisional Patent Application 60/316,198, filed Aug. 30, 2001, entitled "Methods and Apparatus for Protecting Against Spoofed Packet-Based Distributed Denial of Service Attacks." It is related to co-pending U.S. patent application Ser. No. 09/929,877, filed Aug. 14, 2001, entitled "Methods and Apparatus for Protecting Against Overload Conditions on Nodes of a Distributed Network." Both these related applications are assigned to the assignee of the present patent application, and their disclosures are incorporated herein by reference.

FIELD OF THE INVENTION

The present invention relates generally to computer networks, and specifically to methods and systems for protecting against denial of service attacks in computer networks.

BACKGROUND OF THE INVENTION

In a Denial-of-Service (DoS) attack, an attacker bombards a victim network or server with a large volume of message traffic, consuming the victim's available bandwidth, CPU capacity, or other critical system resources, and eventually bringing the victim to a situation in which it is unable to serve its legitimate clients. Distributed DoS (DDoS) attacks can be even more damaging, as they involve creating artificial network traffic from multiple sources simultaneously. In a "conventional" massive-bandwidth attack, the source of the attack may be traced with the help of statistical analysis of the source Internet Protocol (IP) addresses of incoming packets. The victim can subsequently filter out any traffic originating from the suspect IP addresses, and can use the evidence to take legal action against the attacker.

Many attacks, however, now use "spoofed" IP packets—packets containing a bogus IP source address—making it more difficult for the victim network to defend itself against attack. Various methods have been proposed for detecting DDoS attacks using spoofed packets. For example, Poletto describes a number of uses of traffic statistics in detecting DDOS attacks in "Practical Approaches to Dealing with DDOS Attacks," presented at North America Network Operators' Group (NANOG22, Scottsdale, Ariz., May, 2001). Random distribution of IP source addresses is one sign of spoofing. Another possible sign of spoofing is randomization of the Time-To-Live (TTL) field in the IP packet header, which is supposed to indicate the number of hops that a packet has traversed through the network since leaving its source. Sudden changes in the statistical distribution of TTL values can also be detected. Although these statistical measures may enable a computer to recognize when an attack is occurring, however, they do not provide the means to distinguish between spoofed and legitimate packets during the attack.

SUMMARY OF THE INVENTION

It is an object of some aspects of the present invention to provide methods and devices for detecting spoofed packets.

It is a further object of some aspects of the present invention to provide methods and devices for guarding a computer or network against DDOS attacks.

In preferred embodiments of the present invention, a network guard system screens the number of hops traversed by incoming packets in order to assess which packets constitute legitimate network traffic, and which are spoofed. Typically, in IP networks, the number of hops is indicated by the TTL field in the header of each packet. The guard system stores records of IP source addresses together with the expected TTL value (or number of hops) of packets arriving from each source address. If the TTL value of an incoming packet matches the stored TTL value or number of hops for the source address of the packet (to within a tolerance that may be allowed for network instabilities), the guard system recognizes the packet as likely to be legitimate. In this case, the guard system typically allows the packet to pass on to its destination, although further anti-DDoS processing measures may also be carried out before the packet is delivered.

Otherwise, if the TTL value of the packet does not match the stored value, the guard treats the packet as suspect, and either discards it or allows it to pass with a priority that is reduced relative to packets that are known to be legitimate. In this way, suspect packets are prevented from interfering with service of legitimate traffic. The guard system may be active at all times, or it may alternatively be activated only in response to traffic conditions that raise suspicion that a DDoS attack may be in progress.

The guard system is preferably provided with a mechanism for learning the proper TTL values for different IP source addresses. When the guard system receives a packet for whose IP source address there is no corresponding stored TTL value, the system initiates a procedure for verifying the TTL value of the packet. The verified value and the corresponding IP address may then be stored.

Although preferred embodiments are described herein with reference to specific communication protocols, the principles of the present invention may be applied using other protocols, as well, so long as means are provided for recording the number of hops a packet has traversed.

There is therefore provided, in accordance with a preferred embodiment of the present invention, a method for authenticating packet communication traffic, including:

receiving a data packet sent over a network from a source address to a destination address;

reading from the packet a value of a field that is indicative of a number of hops traversed by the packet since having been sent from the source address; and assessing authenticity of the source address responsive to the value.

Preferably, assessing the authenticity includes comparing the value of the field to a reference value associated with the source address. Most preferably, comparing the value of the field includes determining whether the value matches the reference value to within a predefined tolerance. Additionally or alternatively, comparing the value of the field includes comparing the value to an aggregate reference value associated with a subnet to which the source address belongs.

Preferably, assessing the authenticity includes, if there is no reference value associated with the source address that matches the value of the field, validating the value of the field for use as the reference value. Most preferably, reading the value of the field includes reading a first value of the field, and validating the value of the field includes sending a message packet over the network to the source address, receiving a response packet over the network from the source address in response to the message packet, reading a second value of the field from the response packet, and comparing the first and second values of the field.

Further preferably, sending the message packet includes encoding the first value of the field in the message packet, so that the encoded first value is returned in the response packet, and comparing the first and second values includes reading the first value from the response packet. In a preferred embodiment, encoding the first value includes inserting a cookie in the message packet, and receiving the response packet includes authenticating the response packet based on the cookie. In preferred embodiments, sending the message packet includes sending a Transport Control Protocol (TCP) SYN packet, or a Domain Name System (DNS) request packet, or a PING request.

Typically, receiving the data packet includes receiving a sequence of data packets having respective values of the field, and validating the value includes proceeding to validate the value only if a rate of validating the values for the sequence of data packets is no more than a predetermined maximum.

In a preferred embodiment, comparing the value of the field includes comparing the value to a plurality of reference values, which are determined by decrementing a plurality of respective initial values of the field by the same number of hops.

In another preferred embodiment, comparing the value of the field includes determining the reference value based on the value of the field in a protocol handshake exchanged between the source and destination addresses. Preferably, the protocol handshake includes a Transport Control Protocol (TCP) three-way handshake.

In a preferred embodiment, receiving the data packet includes receiving an Internet Protocol (IP) packet, and reading the value of the field includes reading a Time-To-Live (TTL) of the IP packet.

Preferably, receiving the data packet includes intercepting the data packet prior to the packet's reaching the destination address, and the method includes delivering the packet to the destination address depending on the assessed authenticity of the packet. Most preferably, delivering the packet includes discarding the packet if the packet is assessed as inauthentic. Alternatively, delivering the packet includes delivering the packet to the destination address with a reduced level of priority if the packet is assessed as inauthentic. Optionally, delivering the packet includes performing a further check to verify the authenticity after assessing the authenticity of the source address responsive to the value and before forwarding the packet to the destination address.

There is also provided, in accordance with a preferred embodiment of the present invention, apparatus for authenticating packet communication traffic, including a guard device, which is adapted to receive a data packet sent over a network from a source address to a destination address, to read from the packet a value of a field that is indicative of a number of hops traversed by the packet since having been sent from the source address, and to assess authenticity of the source address responsive to the value.

Preferably, the apparatus includes a memory, which is adapted to store a record containing a reference value associated with the source address, wherein the guard device is adapted to read the reference value from the memory and to assess the authenticity of the source address by comparing the value of the field to the reference value.

There is additionally provided, in accordance with a preferred embodiment of the present invention, a computer software product for authenticating packet communication traffic, the product including a computer-readable medium in which program instructions are stored, which instructions, when read by a computer, cause the computer to receive a data packet sent over a network from a source address to a destination address, to read from the packet a value of a field that is indicative of a number of hops traversed by the packet since having been sent from the source address, and to assess authenticity of the source address responsive to the value.

The present invention will be more fully understood from the following detailed description of the preferred embodiments thereof, taken together with the drawings in which:

DETAILED DESCRIPTION OF PREFERRED EMBODIMENTS

Figure 1:
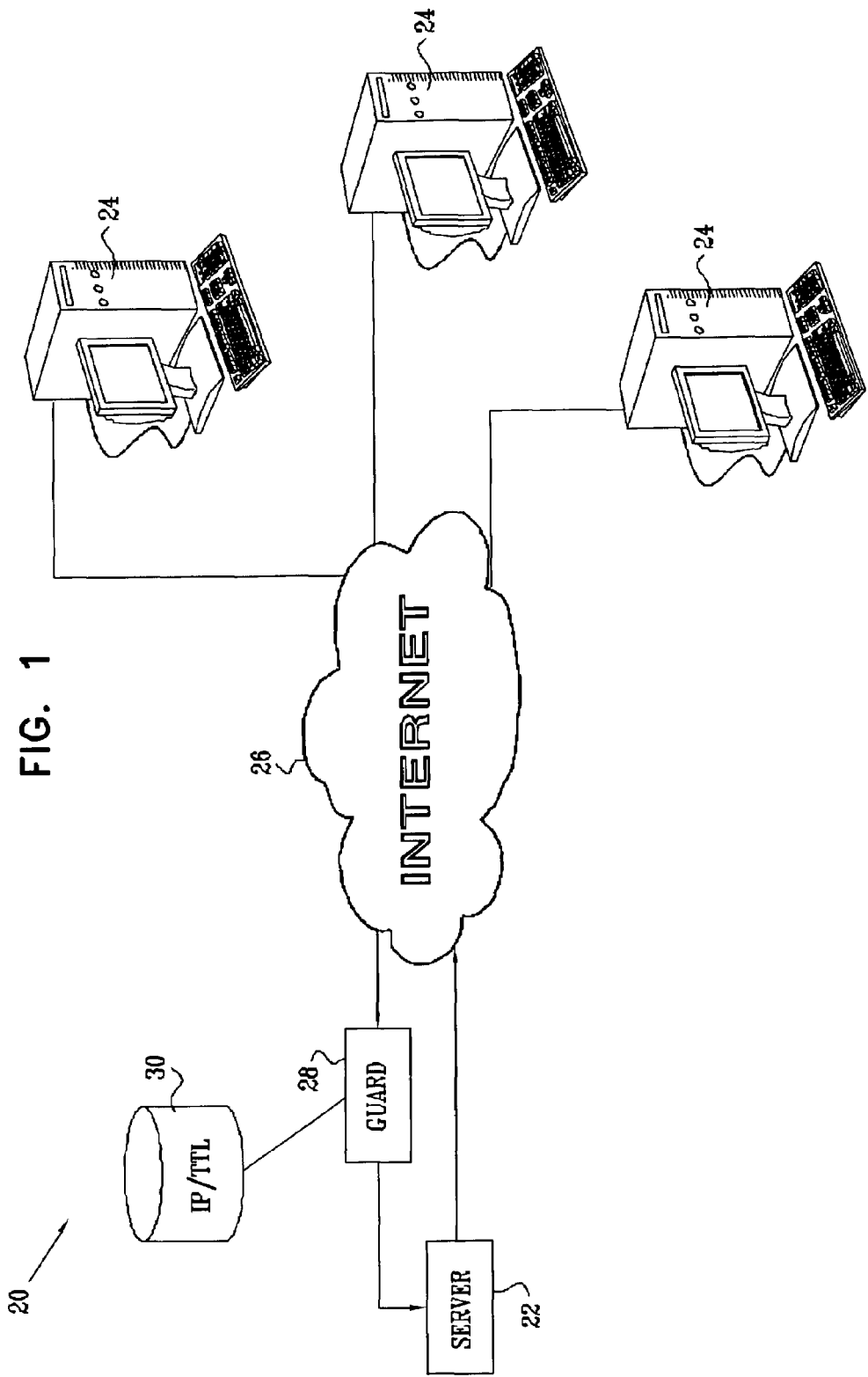
FIG. 1 is a block diagram that schematically illustrates a computer network system, in accordance with a preferred embodiment of the present invention.

FIG. 1 is a block diagram that schematically illustrates a computer network system 20, in accordance with a preferred embodiment of the present invention. A server 22 communicates with clients 24 via a wide-area network (WAN) 26, typically the Internet. To prevent DDoS attacks on server 22, a guard device 28 intercepts incoming packets from network 26 that are addressed to server 22. Optionally, the guard device may process outgoing traffic, as well. The guard device compares the IP source address and TTL field of each packet that it intercepts against reference values stored in a database 30. (Although in the present embodiment database 30 is used to store IP/TTL records, it will be understood that substantially any suitable memory device and data structure may be used for storing this information, and not only a database.)

If the source address and TTL value of an incoming packet match an entry in database 30, guard device 28 passes the packet on to server 22. Alternatively, further anti-DDoS processing measures may be carried out before the packet is delivered to the server. Otherwise, if the source address and TTL value do not match an entry in the database, the guard device regards the packet as suspect and, typically, either discards the packet or passes it on to the server with limiting conditions. For example, the packet may be passed on with reduced priority or limited rate, or with a certain queuing service option or some randomly-selected limitation. The methods used by the guard device in building database 30 and validating incoming packets are described in detail hereinbelow.

Typically, guard device 28 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, guard device 28 may be implemented in dedicated hardware logic, or using a combination of hardware and software elements. The guard device may be a standalone unit, or it may alternatively be integrated with other communication or computing equipment, such as a firewall or intrusion detection system.

For the sake of simplicity, FIG. 1 shows guard device 28 as protecting only server 22. In practical applications, however, the guard device may be used to protect a cluster of servers, or it may be used to protect an entire LAN, intranet or a collection of servers whose traffic is diverted to the guard device. The guard device may be deployed in configurations similar to firewalls known in the art. The methods described hereinbelow for detecting spoofed packets may also be used by a standalone computer, running appropriate software, without a separate guard device.

Before describing in detail the methods of operation of guard device 28, it will be useful to review certain features of the TTL field and its use in IP networks. Time-To-Live (TTL) is a mechanism used in IP to ensure that packets never travel more than a limited number of hops in the Internet. The value of the field is initialized to some value T, which is the bound on the number of hops the packet is allowed to traverse in the network. Each router should decrement the TTL value of each packet passing through it. If the TTL value drops to zero, the packet is removed (dropped) from the Internet.

At any point in the network, the TTL value of an incoming packet originating from some source depends on the initial TTL value that was set by the source. Different operating systems initialize the TTL field in IP packets they create to different values. The standard initial value is 256, but other initial values that are known to exist are 128 (Windows), 64 (Unix), 60, 32 and 30. Thus, when examining the TTL value of a packet, its initial value should be taken into account. Because the vast majority of source-destination path lengths in the Internet are smaller than even the smallest initial TTL value (30), it is generally possible to infer the number of hops the packet traversed from the source based on the value that appears in the packet at a given examination point. Because some of the possible initial TTL values are confusingly close (for example, 64 and 60, or 32 and 30), it may be necessary in some cases to record two alternative path length values. (Note, however, that the operating systems that use initial TTL values of 60 and 30 are old and may become obsolete.) Some operating systems use different initial TTL values for different transport protocols (such as the User Datagram Protocol—UDP and Transport Control Protocol—TCP). Therefore, in authenticating TTL values, the transport protocol may be taken into consideration, as well.

The TTL value of any packet received from the Internet is a function of the length of the Internet path between the packet source and the destination The paths taken by successive packets can change, however, so that different packets from the same source may have different TTL values. Therefore, a mismatch between the TTL value of a packet received by guard device 28 and the reference value stored in database 30 is not conclusive evidence that the packet is spoofed.

Path changes typically occur due to the following reasons:
1. Failures in the Internet.
2. Changes in routing policies used in the Internet.
3. Changes in the Internet infrastructure or topology (such as addition of a new link).
4. Load balancing mechanisms.
5. Use of network address translator (NAT) machines for Internet access.
6. Protocol-dependent path variations, due to transport-layer processing at the packet source, for example, or to processing by intermediate devices, such as firewall machines.

The first three types of events are generally rare, and typically result in stabilization of the characteristic TTL at a new value after a few seconds. Guard device 28 can then validate the new value (as described below) and store it in database 30. In practice, the inventors have found that more than 90% of IP addresses exhibit stable TTL values over any given 24-hour period. The last three types of events typically lead to continual variations of the TTL value within a small, consistent range. Therefore, generally speaking, guard device 28 should be tolerant of small deviations of the TTL values of incoming packets from the corresponding values in database 30.

Furthermore, a given packet source may generate different IP packets with different initial TTL values. As noted above, some operating systems use different initial TTL values for different transport protocols. As another example, when a packet must be retransmitted, due to a TCP timeout, the packet source often sets the initial TTL value to 256 in order to give the packet a longer Internet lifetime, rather than the default initial TTL value that is usually used. Guard device 28 is preferably programmed to recognize such eventualities and to allow the retransmitted packet to reach server 22. Thus, if the guard device determines that the characteristic TTL value for packets received from a given source address is 103, for example, representing 25 hops from an initial value of 128, then the guard device should also be prepared to accept packets from this source address with a TTL values of 231, and possibly 39, 35, 7 and 5, as well.

Moreover, as noted above, the actual number of hops traversed by a packet may be ambiguous. For example, if the received TTL value is 56, the path length can be either 4 hops (corresponding to an initial TTL value of 60) or 8 (initial TTL value of 64). In such cases, guard device 28 may consider all the possible TTL values. Additional ambiguity may arise because of the protocol-dependent initial TTL values used by some operating systems. When there are ambiguities of this sort, guard device 28 may use a confidence rating system to classify incoming packets with TTL values that may be correct, rather than a simple "go/no go."

Database 30 may hold reference TTL values as either absolute values (such as 103 in the example above), relative values (25 in this example) or both. To keep this reference data up to date, guard device 28 preferably rechecks the values periodically, using the verification procedure described below. Preferably, only authenticated IP source/TTL entries are kept in the database. To save memory space, the guard device may manage the database as a cache, discarding old entries that have not been used recently. As a further means for saving memory and processing time, database 30 may hold TTL values by subnet (a TTL value for each different 24-bit IP address prefix, for example), in addition to or instead of entries for individual IP source addresses.

Figure 2:
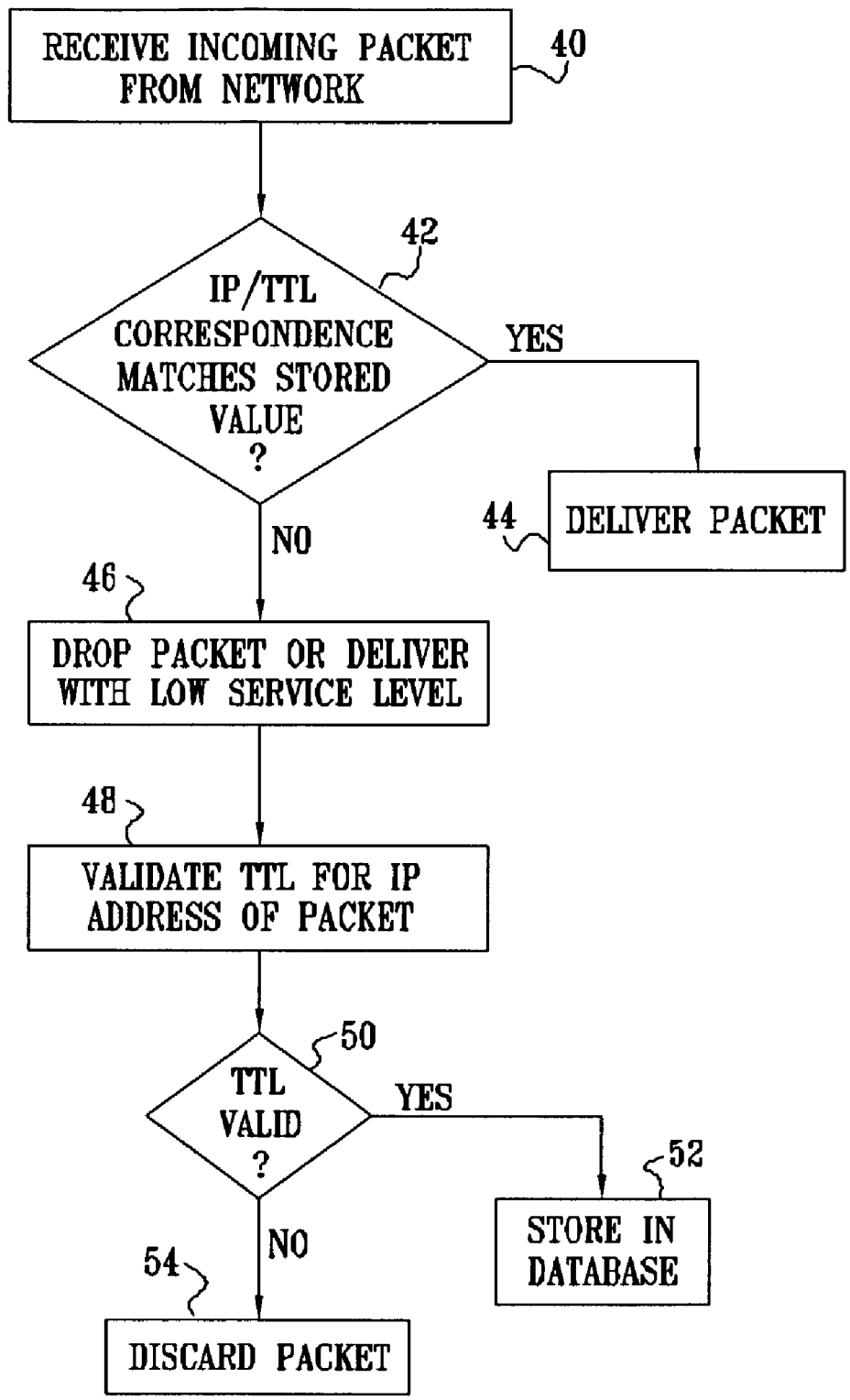
FIG. 2 is a flow chart that schematically illustrates a method for screening incoming packets received from a network, in accordance with a preferred embodiment of the present invention.

FIG. 2 is a flow chart that schematically illustrates a method used by guard device 28 for validating incoming packets from network 26, in accordance with a preferred embodiment of the present invention. The method may be initiated when the guard device receives an incoming packet from the network, at a packet interception step 40. Alternatively, guard device 28 may become active only under stress conditions, in which a DDoS attack on server 22 is suspected, due to particularly heavy incoming traffic or to other traffic statistics. In this case, some additional trigger is required for step 40. For example, guard device 28 may become active when it detects an unusually large number of incoming TCP SYN-ACK or DNS request packets.

Furthermore, some incoming packets may not be subject to suspicion, and therefore need not be validated by the guard device. For example, once a TCP connection has been established between server 22 and one of clients 24, using the conventional TCP three-way handshake, each side of the connection can be certain that the IP address of the other side is legitimate, not spoofed. Therefore, guard device 28 preferably allows TCP/IP packets on established connections to pass through to server 22 without interruption for validation. Handling of the TCP handshake itself by the guard device is described further hereinbelow. On the other hand, all packets sent over connectionless protocols, such as UDP or ICMP, must generally be validated. Packets using the Domain Name System (DNS) protocol must generally be validated, as well. The need to validate packets of other protocol types (or the absence of such need) will be apparent to those skilled in the art.

Guard device 28 checks the IP source address of the incoming packet against database 30, at a record checking step 42. If there is a record in the database corresponding to this source address, the guard device checks the TTL value held in the database against the TTL value recorded in the packet header. The comparison may be either exact or relative. In exact comparison, the TTL value of the incoming packet must match the record in the database exactly. Thus, if the TTL value recorded in the database is 103 (as in the example cited earlier), then the incoming packet is considered valid only if its TTL value is exactly 103. The advantage of this approach is that it reduces the probability that a hacker mounting a DDoS attack will successfully guess the correct TTL value to insert in a spoofed packet. The exact match criterion may be relaxed by ±1 or ±2 TTL steps in order to account for small variations due to load balancing, NAT machines and protocol-dependent effects, as noted above. Note that the exact comparison approach rejects TTL variations that may arise due to different initial TTL settings, as described above.

Alternatively or additionally, guard device 28 may validate an IP source address based on the TTL value. As long as an IP address is considered valid, the guard device allows all traffic from the address to pass through to server 22. An IP source address can be validated, for example, simply by testing an incoming packet from the address. If the TTL value of the packet is correct, the IP source address is then considered valid for a certain period of time. As another example, the IP source address may be validated if the fraction of packets arriving from the address that have the correct TTL value is reasonably large (say 20%). The benefit of such an IP validation is that it allows faster handling of most packets, and reduces the overhead associated with testing the TTL.

In relative comparison, guard device 28 checks the number of hops that the incoming packet has taken, rather than the exact value of the TTL field. In other words, referring again to the example above, if a value of 25 hops is recorded in database 30 for a given IP source address, then TTL values of 5, 7, 35, 39, 103 and 231 will be considered valid. As noted above, when there is more than one probable value for the number of hops, there may be even more possible TTL values. Relative comparison, in contrast to exact comparison, reduces the likelihood of rejecting valid packets. When TTL values are stored in database 30 by subnet, only relative comparison can generally be used, since different packet sources in the same subnet may have different operating systems and will therefore set different initial TTL values. The relative match criteria are also preferably relaxed by a number of TTL steps to account for the small variations mentioned above, as well as for differences in path length within a subnet when database 30 stores TTL values by subnet.

If the TTL value of the incoming packet matches the database value, guard device 28 allows the packet to pass on for further processing, at a packet delivery step 44. The matching TTL value does not conclusively prove that the packet is not spoofed, since there is a certain probability that a hacker will have correctly guessed the expected TTL value. Therefore, the packet may be subject to further anti-DDoS processing before it is submitted to the server. Alternatively, guard device 28 may pass the packet through directly to server 22. In any case, the probability of a spoofed packet reaching the server is substantially reduced.

If the TTL value of the incoming packet does not match a value in database 30 (either because there is no entry for the IP source address of the packet, or because the TTL value in the database is different), guard device 28 treats the packet as suspect, at an invalid packet processing step 46. The simplest response for the guard device to implement is to consider the suspect packet to be invalid and discard it. This approach will lead the guard device to drop a certain number of valid packets. In most cases, higher-level protocols running on clients 24 will resend the packets later, by which time the guard device will have learned the appropriate IP source address and TTL value, as described below. Alternatively, the guard device may allow the suspect packet to pass through to server 22, but at a lower service level than the presumably valid packets delivered at step 44. The decision as to how to treat suspect packets may be made by a system operator of server 22 and may also depend on the overall level of incoming traffic at the time the suspect packet is received.

When guard device 28 has received a suspect packet for which there is no entry in database 30, or in any case in which there is a likelihood that the suspect packet is, in fact, valid, the guard device attempts to verify that the TTL value of the packet is correct, at a TTL validation step 48. Preferably, the guard device sends a message to the IP source address of the suspect packet, and then examines the reply in order to verify the TTL value, at a TTL verification step 50. This method is described in detail hereinbelow with reference to FIG. 3. If the TTL value is successfully verified, guard device 28 stores the value in database 30 along with the corresponding IP source address, at a database update step 52. The verified TTL value is then available for use in validating packets received subsequently by the guard device. Otherwise, if step 50 is unsuccessful, the TTL value and IP source address of the suspect packet are simply discarded, at a discard step 54.

Optionally, guard device 28 limits the number of new source addresses that it will validate during any given period of time. Otherwise, a hacker could bombard the guard device with packets from so many new addresses requiring validation, that the guard device might be unable to process the flow of legitimate packets.

Figure 3:
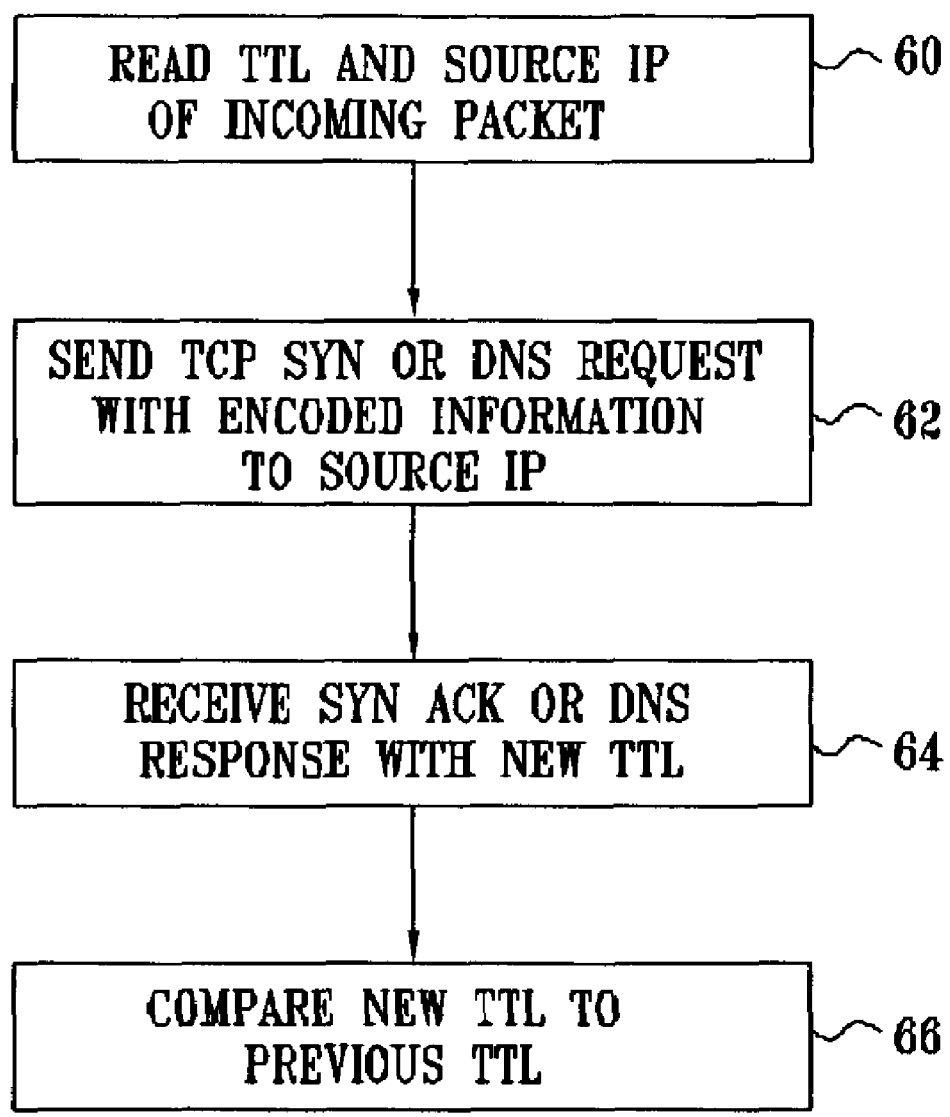
FIG. 3 is a flow chart that schematically illustrates a method for verifying TTL values, in accordance with a preferred embodiment of the present invention.

FIG. 3 is a flow chart that schematically shows details of validation step 48, in accordance with a preferred embodiment of the present invention. Guard device 28 reads the IP source address and TTL value of the suspect incoming packet (received at step 40), at a header reading step 60. The guard device uses this information to construct an outgoing message packet addressed to the IP source address of the suspect packet, at a message generation step 62. The message is of a type that requires the recipient to respond, in such a way that if the guard device receives a response, it will know that the source IP address is real, not spoofed. A number of different types of messages may be used for this purpose, for example:

- A TCP SYN packet. This is the first step in the well-known TCP three-way handshake for establishing a TCP connection. The recipient is expected to respond with a TCP SYN-ACK packet, or with a RST packet if it rejects the connection. In either case, the returned packet will contain a TTL value and a sequence number corresponding to the packet sequence number of the original SYN packet. The TCP SYN packet may also include a cookie, as described below.
- A DNS request packet. The recipient is expected to return a DNS response packet, which will contain a TTL value and an identifier (ID) field, corresponding to the ID field inserted by the guard device in the request packet.
- A PING request sent over ICMP. The PING reply will contain information that enables the guard device to determine the TTL value. Preferably, a cookie containing encoded information is embedded in the 8-bit code field of the ICMP packet. In most cases, the PING reply will contain the same code field without change.

Preferably, guard device 28 inserts encoded information into the outgoing message packet (for example, into the TCP SYN or DNS request packet) that it sends at step 62, in such a way that the encoded information will be returned in the response from the remote IP source address. This information assists the guard device in verifying the TTL value provided by the response. For example, the guard device may set a cookie in the sequence number of the TCP SYN packet, and may set the source port field in the TCP header to be equal to the TTL value of the suspect packet that it has received. Alternatively or additionally, the TTL value of the suspect packet may be encoded in the cookie. SYN cookies are known in the art, although for purposes other than that described here.

As another example, guard device may set a cookie in an outgoing DNS request packet that it sends to an unrecognized IP source address. This approach is useful particularly for verifying the source of DNS replies sent from clients 24 to server 22. Preferably, the guard device sets the recursive flag of the DNS request to "NO." The query contained in the DNS request includes the original domain name of the incoming DNS reply, concatenated with a cookie indicating the received TTL value and certain information received in the DNS reply (such as the original recursive flag and original DNS ID). The new DNS ID of the outgoing DNS request contains at tag indicating that a cookie has been inserted in the packet and a pointer to the cookie in the domain name field. These elements of the DNS ID enable the guard device to easily recognize packets that do not contain a cookie and to efficiently process the contents of packets that do include cookies, as described below.

Guard device 28 waits to receive the expected response from the remote IP source address, at a response reception step 64. (If no response is received, the guard device will take no further action with respect to this address.) In the case of the encoded TCP SYN packet described above, for example, the response should be a SYN-ACK or RST packet. In this case, the guard device reads the sequence number of the received packet, and authenticates the packet by checking for the cookie in the sequence number. The guard device then reads the value of the TTL field from the IP header of the received packet, and compares this value to the destination port value in the packet's TCP header, at a TTL comparison step 66. The destination port value should be equal to the source port value set by the guard device in the SYN packet, i.e., to the TTL value of the suspect packet received earlier, at step 40. If the current and previous TTL values are equal, the guard device concludes that the values are correct and valid, and stores the IP source address and TTL value in database 30.

When guard device 28 receives a DNS reply, it first verifies the cookie. If the cookie is authenticated, the guard device compares the TTL value of the DNS reply packet to the encoded TTL value in the DNS domain name. If the comparison is successful, the remote IP source address is verified as a domain name server. Preferably, if the "recursive desired" flag was set in the original DNS request from the domain name server, the guard device now sends another DNS request to domain name server, using the original domain name and original DNS ID. Otherwise, the guard device sends a reply to server 22, "redirecting" it to the same external domain name server in order to avoid timeout and referral to a different domain name server.

Other methods may also be used for encoding information in the outgoing TCP SYN or DNS request packet at step 62. As another example, the TTL value of the suspect packet may be encoded in the sequence number of the SYN packet sent to the IP source address. When the guard device receives the SYN-ACK or RST packet in response, it decodes the sequence number in order to retrieve the previous TTL value and compare it to the TTL field of the current packet at step 66.

The procedure of FIG. 3 may also be applied when guard device 28 receives an incoming TCP SYN or SYN-ACK packet at step 40, and the IP source address and TTL value of the packet do not match any entry in database 30. Since there is not yet a connection established between server 22 and the client 24 that sent the SYN or SYN-ACK packet, the guard device cannot know whether the IP source address of the incoming packet is legitimate or spoofed. It therefore suspends or discards the SYN or SYN-ACK packet that it received. The guard device then sends its own TCP SYN packet to the IP source address of the incoming packet, and waits to receive the SYN-ACK or RST response packet in order to verify the TTL value, as described above. When the client subsequently resends its original SYN or SYN-ACK, the verified TTL value will have been entered in database 30, and guard device 28 will allow the packet to pass through to server 22.

As noted above, guard device 28 may actively screen incoming packets at all times, or it may alternatively screen packets only under certain stress conditions. In the latter case, even while the guard device is inactive, it may still collect TTL values for inclusion in database 30. For example, the guard device may observe TCP handshakes carried out by server 22 and various clients 24 over network 26. A client initiating such a handshake sends a SYN packet to server 22, which responds by sending a SYN-ACK packet back to the client. The client must then respond with its own ACK in order to complete the connection. The SYN, SYN-ACK and ACK packets contain the appropriate sequence numbers. If the "client" is a spoofed source, it will not receive the SYN-ACK, and therefore will not return the final ACK. Thus, if guard device 28 observes SYN and ACK packets from the same IP source address, with the same TTL value and the appropriate sequence number in the ACK packet, it can be assured that the IP source address and TTL value are valid, and may make an entry in database 30 accordingly.

Although the preferred embodiments described herein are based specifically on IP and on certain transport and application protocols that run over IP, the principles of the present invention may similarly be applied using other network, protocols, as well as other transport and application protocols meeting the functional requirements described above. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for authenticating packet communication traffic, comprising:
    recording respective reference values indicative of numbers of hops that are traversed by data packets received over a network from a set of source addresses;
    receiving a data packet sent over the network from a source address to a destination address;
    reading from the packet a value of a field that is indicative of a number of hops traversed by the packet since having been sent from the source address; and
    determining the source address of the packet to be authentic if the value matches a respective reference value associated with the source address to within a predefined tolerance.

2. A method according to claim 1, wherein the respective reference value comprises an aggregate reference value associated with a subnet to which the source address belongs.

3. A method according to claim 1, wherein recording the respective reference values comprises, if there is no reference value associated with the source address that matches the value of the field when the data packet is received, validating the value of the field for use as the reference value.

4. A method according to claim 3, wherein reading the value of the field comprises reading a first value of the field, and wherein validating the value of the field comprises:
    sending a message packet over the network to the source address;
    receiving a response packet over the network from the source address in response to the message packet;
    reading a second value of the field from the response packet; and
    comparing the first and second values of the field.

5. A method according to claim 4, wherein sending the message packet comprises encoding the first value of the field in the message packet, so that the encoded first value is returned in the response packet, and wherein comparing the first and second values comprises reading the first value from the response packet.

6. A method according to claim 5, wherein encoding the first value comprises inserting a cookie in the message packet, and wherein receiving the response packet comprises authenticating the response packet based on the cookie.

7. A method according to claim 4, wherein sending the message packet comprises sending a Transport Control Protocol (TCP) SYN packet.

8. A method according to claim 4, wherein sending the message packet comprises sending a Domain Name System (DNS) request packet.

9. A method according to claim 4, wherein sending the message packet comprises sending a PING request.

10. A method according to claim 3, wherein receiving the data packet comprises receiving a sequence of data packets having respective values of the field, and wherein validating the value comprises proceeding to validate the value only if a rate of validating the values for the sequence of data packets is no more than a predetermined maximum.

11. A method according to claim 1, wherein the respective reference values comprise a plurality of reference values, which are determined by decrementing a plurality of respective initial values of the field by the same number of hops.

12. A method according to claim 1, wherein recording the respective reference values comprises determining the respective reference value for the source address based on the value of the field in a protocol handshake exchanged between the source and destination addresses.

13. A method according to claim 12, wherein the protocol handshake comprises a Transport Control Protocol (TCP) three-way handshake.

14. A method according to claim 1, wherein receiving the data packet comprises receiving an Internet Protocol (IP) packet, and wherein reading the value of the field comprises reading a Time-To-Live (TTL) of the IP packet.

15. A method according to claim 1, wherein receiving the data packet comprises intercepting the data packet prior to the packet's reaching the destination address, and comprising delivering the packet to the destination address depending on whether the source address is determined to be authentic.

16. A method according to claim 15, wherein delivering the packet comprises discarding the packet if the packet is assessed as inauthentic.

17. A method according to claim 15, wherein delivering the packet comprises delivering the packet to the destination address with a reduced level of priority if the packet is assessed as inauthentic.

18. A method according to claim 15, wherein determining the source address to be authentic comprises performing a further check to verify authenticity of the source address after matching the value to the respective reference value and before conveying the packet to the destination address.

19. Apparatus for authenticating packet communication traffic, comprising:
    a memory, which is adapted to store records containing respective reference values indicative of numbers of hops that are traversed by data packets received over a network from a set of source addresses; and
    a guard device, which is adapted to receive a data packet sent over a network from a source address to a destination address, to read from the packet a value of a field that is indicative of a number of hops traversed by the packet since having been sent from the source address, and to read from the memory a respective reference value associated with the source address and determine the source address of the packet to be authentic if the value matches to within a predefined tolerance.

20. Apparatus according to claim 19, wherein the respective reference value comprises an aggregate reference value associated with a subnet to which the source address belongs.

21. Apparatus according to claim 19, wherein the guard device is adapted, if there is no reference value associated with the source address in the memory that matches the value of the field when the data packet is received, to validate the value of the field for use as the reference value.

22. Apparatus according to claim 21, wherein the value of the field that is read from the packet comprises a first value of the field, and wherein the guard device is adapted to validate the first value by sending a message packet over the network to the source address, receiving a response packet over the network from the source address in response to the message packet, reading a second value of the field from the response packet, and comparing the first and second values of the field.

23. Apparatus according to claim 22, wherein the guard device is adapted to encode the first value of the field in the message packet, so that the encoded first value is returned in the response packet, and to read the first value from the response packet.

24. Apparatus according to claim 23, wherein the guard device is adapted to insert a cookie encoding the first value in the message packet, and to authenticate the response packet based on the cookie.

25. Apparatus according to claim 22, wherein the message packet comprises a Transport Control Protocol (TCP) SYN packet.

26. Apparatus according to claim 22, wherein the message packet comprises a Domain Name System (DNS) request packet.

27. Apparatus according to claim 22, wherein the message packet comprises a PING request.

28. Apparatus according to claim 21, wherein the data packet is one of a sequence of data packets having respective values of the field, and wherein the guard device is adapted to determine a rate of validating the values for the sequence of data packets, and to validate the value if the rate is no more than a predetermined maximum.

29. Apparatus according to claim 19, wherein the guard device is adapted to compare the value of the field to a plurality of reference values, which are determined by decrementing a plurality of respective initial values of the field by the same number of hops.

30. Apparatus according to claim 19, wherein the guard device is adapted to determine the respective reference values based on the value of the field in a protocol handshake exchanged between the source and destination addresses.

31. Apparatus according to claim 30, wherein the protocol handshake comprises a Transport Control Protocol (TCP) three-way handshake.

32. Apparatus according to claim 19, wherein the data packet comprises an Internet Protocol (IP) packet, and wherein the value of the field comprises a Time-To-Live (TTL) of the IP packet.

33. Apparatus according to claim 19, wherein the guard device is adapted to intercept the data packet prior to the packet's reaching the destination address, and to deliver the packet to the destination address depending on whether the source address is determined to be authentic.

34. Apparatus according to claim 33, wherein the guard device is adapted to discard the packet if the packet is assessed as inauthentic.

35. Apparatus according to claim 33, wherein the guard device is adapted to deliver the packet to the destination address with a reduced level of priority if the packet is assessed as inauthentic.

36. Apparatus according to claim 33, wherein the guard device is adapted to perform a further check to verify the authenticity of the source address after matching the value to the respective reference value and before conveying the packet to the destination address.

37. A computer software product for authenticating packet communication traffic, the product comprising a computer-readable medium in which program instructions are stored, which instructions, when read by a computer, cause the computer to store records containing respective reference values indicative of numbers of hops that are traversed by data packets received over a network from a set of source addresses, and upon receiving a data packet sent over a network from a source address to a destination address, to read from the packet a value of a field that is indicative of a number of hops traversed by the packet since having been sent from the source address, and to determine the source address of the packet to be authentic if the value matches a respective reference value associated with the source address to within a predefined tolerance.

38. A product according to claim 37, wherein the respective reference value comprises an aggregate reference value associated with a subnet to which the source address belongs.

39. A product according to claim 37, wherein the instructions cause the computer, if there is no reference value associated with the source address in the memory that matches the value of the field when the data packet is received, to validate the value of the field for use as the reference value.

40. A product according to claim 39, wherein the value of the field that is read from the packet comprises a first value of the field, and wherein the instructions cause the computer to validate the first value by sending a message packet over the network to the source address, receiving a response packet over the network from the source address in response to the message packet, reading a second value of the field from the response packet, and comparing the first and second values of the field.

41. A product according to claim 40, wherein the instructions cause the computer to encode the first value of the field in the message packet, so that the encoded first value is returned in the response packet, and to read the first value from the response packet.

42. A product according to claim 41, wherein the instructions cause the computer to insert a cookie encoding the first value in the message packet, and to authenticate the response packet based on the cookie.

43. A product according to claim 40, wherein the message packet comprises a Transport Control Protocol (TCP) SYN packet.

44. A product according to claim 40, wherein the message packet comprises a Domain Name System (DNS) request packet.

45. A product according to claim 40, wherein the message packet comprises a PING request.

46. A product according to claim 39, wherein the data packet is one of a sequence of data packets having respective values of the field, and wherein the instructions cause the computer to determine a rate of validating the values for the sequence of data packets, and to validate the value if the rate is no more than a predetermined maximum.

47. Product according to claim 37, wherein the instructions cause the computer to compare the value of the field to a plurality of reference values, which are determined by decrementing a plurality of respective initial values of the field by the same number of hops.

48. A product according to claim 37, wherein the instructions cause the computer to determine the respective reference values based on the value of the field in a protocol handshake exchanged between the source and destination addresses.

49. A product according to claim 48, wherein the protocol handshake comprises a Transport Control Protocol (TCP) three-way handshake.

50. A product according to claim 45, wherein the data packet comprises an Internet Protocol (IP) packet, and wherein the value of the field comprises a Time-To-Live (TTL) of the IP packet.

51. A product according to claim 45, wherein the instructions cause the computer to intercept the data packet prior to the packet's reaching the destination address, and to deliver the packet to the destination address depending on whether the source address is determined to be authentic.

52. A product according to claim 51, wherein the instructions cause the computer to discard the packet if the packet is assessed as inauthentic.

53. A product according to claim 51, wherein the instructions cause the computer to deliver the packet to the destination address with a reduced level of priority if the packet is assessed as inauthentic.

54. A product according to claim 51, wherein the instructions cause the computer to perform a further check to verify authenticity of the source address after matching the value to the respective reference value and before conveying the packet to the destination address.

* * * * *

UNITED STATES PATENT AND TRADEMARK OFFICE
CERTIFICATE OF CORRECTION

PATENT NO. : 7,171,683 B2 Page 1 of 1
APPLICATION NO. : 10/232993
DATED : January 30, 2007
INVENTOR(S) : Guy Pazi et al.

It is certified that error appears in the above-identified patent and that said Letters Patent is hereby corrected as shown below:

Title page, item [73]
In the Assignee:

Please delete "Riverhead Networks Inc." and insert --Cisco Technology, Inc.--

Signed and Sealed this

Twenty-third Day of October, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,171,683 B2 |
| APPLICATION NO. | : 10/232993 |
| DATED | : January 30, 2007 |
| INVENTOR(S) | : Guy Pazi et al. |

Page 1 of 1

It is certified that error appears in the above-identified patent and that said Letters Patent is hereby corrected as shown below:

Title Page, item [73]

In the Assignee:

Please delete "Riverhead Networks Inc." and insert --Cisco Technology, Inc.--

Signed and Sealed this

Twenty-second Day of January, 2008

JON W. DUDAS
*Director of the United States Patent and Trademark Office*